(No Model.)
J. A. PESANT.
Vehicle Wheel.
No. 235,802.                    Patented Dec. 21, 1880.
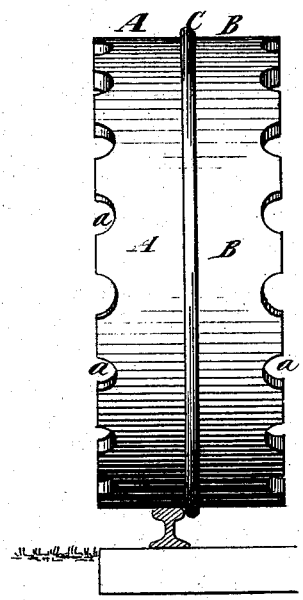
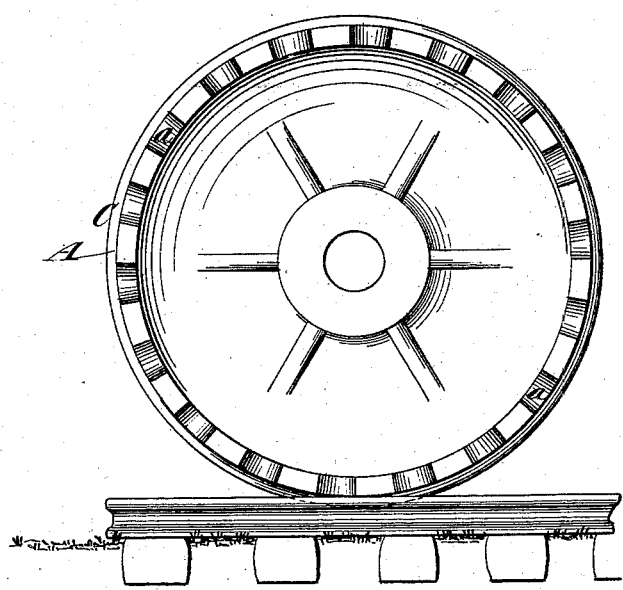
Witnesses:
Louis M. Whitehead
Fredk Haynes
Inventor:—
José A. Pesant
by his Attorneys
Brown & Brown

UNITED STATES PATENT OFFICE.

JOSÉ A. PESANT, OF HAVANA, CUBA.

VEHICLE-WHEEL.

SPECIFICATION forming part of Letters Patent No. 235,802, dated December 21, 1880.

Application filed September 15, 1880. (No model.)

*To all whom it may concern:*

Be it known that I, JOSÉ A. PESANT, of Havana, in the Island of Cuba, have invented a certain new and Improved Wheel for Vehicles, of which the following is a specification.

One object of my invention is to produce a wheel which will be susceptible of running on the ground or of running on tracks or railways even of different gages, and another object is to facilitate the mounting of wheels on tracks or railways.

To this end my invention consists in a wheel having two coincident treads and an intermediate flange, the treads and flange bearing such relative proportion that the wheel is adapted for running on the ground, and that either tread may run on a track or railway, and the said treads having in their edges a series of notches extending through the same and forming intervening lateral teeth or projections, whereby facility is afforded for mounting a rail.

In the accompanying drawings, Figure 1 is a face view of a wheel embodying my invention, and Fig. 2 is a side view thereof.

Similar letters of reference designate corresponding parts in both figures.

The wheel may be made in any suitable manner — for instance, by casting its hub, web, and spokes, treads, and flange in one piece of metal, or by forming the hub, treads, flange, and spokes separately and connecting them in any suitable manner.

A and B designate two treads, which are shown as cylindrical in form and coincident one with the other, and C designates an intermediate flange. This flange projects insufficiently to interfere with the running of the wheel on the ground, and yet sufficiently to guide the wheel along the track or railway when it is used thereon. The two treads with the intermediate flange afford provision for using pairs of the wheels of this kind upon tracks or railways of different gages, for the treads A may run upon tracks or railways with the flanges on the inner side of the rails in the ordinary manner, or the treads B may run on the tracks or railways with the flanges on the outer sides of the rails. In the edge of each tread of the wheel are series of notches extending through the same and forming a series of lateral teeth or projections, which, by catching on rails when the wheel occupies a position at an angle thereto, will afford facility for effecting the mounting of the wheels on the rails.

What I claim as my invention, and desire to secure by Letters Patent, is—

A wheel for a vehicle having two coincident treads and an intermediate flange, and having in the edges of said treads notches extending through the same and forming intervening lateral teeth or projections, the said treads and said flange being so proportioned relatively to each other that the wheel is adapted for use upon the ground and for crossing the rails of a railway in mounting the same, substantially as specified.

JOSÉ ANTO. PESANT.

Witnesses:
 M. PESANT,
 T. J. KEANE.